(12) United States Patent
Smith (10) Patent No.: US 12,078,529 B2
(45) Date of Patent: Sep. 3, 2024

(54) LOW NOISE OPTICAL ASSEMBLY

(71) Applicant: Lumentum Operations LLC, San Jose, CA (US)

(72) Inventor: Colin Smith, Paignton (GB)

(73) Assignee: Lumentum Operations LLC, San Jose, CA (US)

(*) Notice: Subject to any disclaimer, the term of this patent is extended or adjusted under 35 U.S.C. 154(b) by 57 days.

(21) Appl. No.: 17/934,754

(22) Filed: Sep. 23, 2022

(65) Prior Publication Data

US 2024/0035880 A1 Feb. 1, 2024

Related U.S. Application Data

(60) Provisional application No. 63/369,866, filed on Jul. 29, 2022.

(51) Int. Cl.
*G01J 1/02* (2006.01)
*G01J 1/42* (2006.01)
*G02B 27/14* (2006.01)

(52) U.S. Cl.
CPC ............ *G01J 1/0295* (2013.01); *G01J 1/4257* (2013.01); *G02B 27/14* (2013.01)

(58) Field of Classification Search
CPC ....... G02B 27/14; G01J 1/0295; G01J 1/0407; G01J 1/0477; G01J 1/4257
See application file for complete search history.

(56) References Cited

U.S. PATENT DOCUMENTS 5,581,403 A * 12/1996 Kobayashi ......... G02B 19/0052
359/484.04

FOREIGN PATENT DOCUMENTS

JP 11150323 A * 6/1999 ............. H01S 3/005

* cited by examiner

*Primary Examiner* — Kevin K Pyo
(74) *Attorney, Agent, or Firm* — Harrity & Harrity, LLP (57) ABSTRACT

In some implementations, an optical assembly includes an optical power monitor to receive a portion of an optical beam and to perform a measurement on the portion of the optical beam; an optical tap to tap the optical beam and provide the portion of the optical beam; and an optical element to allow the portion of the optical beam from the optical tap to propagate toward the optical power monitor, wherein the optical element includes an absorptive material to absorb light other than the portion of the optical beam that is propagated toward the optical power monitor.

20 Claims, 5 Drawing Sheets

LOW NOISE OPTICAL ASSEMBLY

CROSS-REFERENCE TO RELATED APPLICATION

This Patent Application claims priority to U.S. Provisional Patent Application No. 63/369,866, filed on Jul. 29, 2022, and entitled "LOW NOISE OPTICAL POWER MONITOR." The disclosure of the prior Applications is considered part of and is incorporated by reference into this Patent Application.

TECHNICAL FIELD

The present disclosure relates generally to optical assemblies and to an optical assembly for achieving low noise optical power monitoring.

BACKGROUND

An optical power monitor (OPM) may measure a power of an optical signal or an optical beam. For example, an optical power monitor may tap a portion of an optical beam in an optical communication system and measure the tapped portion of the optical beam. The optical power monitor may provide feedback information regarding the power of the optical beam to enable control of the optical communication system. For example, based on the feedback information, a controller may alter a current level, an output optical power level, an attenuation level, an amplification level, a laser wavelength, or a tunable filter among other examples.

SUMMARY

In some implementations, an optical assembly includes an optical power monitor to receive a portion of an optical beam and to perform a measurement on the portion of the optical beam; an optical tap to tap the optical beam and provide the portion of the optical beam; and an optical element to allow the portion of the optical beam from the optical tap to propagate toward the optical power monitor, wherein the optical element includes an absorptive material to absorb light other than the portion of the optical beam that is propagated toward the optical power monitor.

In some implementations, an optical assembly, includes at least one optical power monitor to receive a portion of an optical beam and to perform a measurement on the portion of the optical beam; an optical tap to tap the optical beam and provide the portion of the optical beam; and an optical element to direct the portion of the optical beam from the optical tap toward the at least one optical power monitor, wherein the optical tap, the optical element, and the optical power monitor are separated by free space, and wherein the optical element includes an absorptive material to absorb light other than the portion of the optical beam and a reflector material to reflect the portion of the optical beam toward the optical power monitor.

In some implementations, an optical system includes an optical emitter to emit an optical beam; an optical power monitor to receive a portion of the optical beam; and an optical element to direct the portion of the optical beam toward the optical power monitor, wherein the optical element includes an absorptive material to absorb light other than the portion of the optical beam and a reflector to reflect the portion of the optical beam toward the optical power monitor.

DETAILED DESCRIPTION

The following detailed description of example implementations refers to the accompanying drawings. The same reference numbers in different drawings may identify the same or similar elements.

Optical power monitors may be implemented in free space optics. For example, an optical tap, which taps a portion of an optical beam for monitoring, may be aligned to an optical power monitor and separated by free space. In other words, the tapped portion of the optical beam may travel through a free space medium (e.g., air) for at least a portion of an optical path between the optical tap and the optical power monitor. The optical path may also include other free space optical elements, such as lenses, filters, or mirrors to direct the portion of the tapped optical beam to the optical power monitor.

However, when implementing an optical power monitor and optical tap system using free space optics, scattered light, reflected light, or other spurious light (in general, "unwanted light") may also be incident on the optical power monitor. In other words, unwanted light may combine with a tapped portion of an optical signal and may be unwanted at the optical power monitor. The unwanted light may be a form of noise that reduces a measurement accuracy of the optical power monitor. For example, when the optical power monitor determines an optical power of the tapped portion of the optical beam, the optical power may include a contribution from the unwanted light, resulting in a higher measured optical power than is actually present in the tapped portion of the optical beam. Further, the unwanted light may vary in time, resulting in a measured optical power that varies in time when the tapped portion is constant with time.

A housing may be provided around the entire free space optics assembly (e.g., the optical tap and the optical power monitor) to reduce a presence of unwanted light. Such a housing may include an input opening and an output opening to receive and output the optical beam that is to be tapped. However, using openings with a size approximately equal to the optical beam (e.g., to minimize unwanted light entering through the openings) and aligning the openings to the optical beam may be difficult and/or inaccurate. Accordingly, the housing may interfere with the optical beam, causing a negative impact to performance of an optical system (e.g., an optical communication system, an optical measurement system, a Mach-Zehnder interferometer, or a Michelson interferometer, among other examples) using the optical beam. As a result, it is desirable to reduce an impact of unwanted light on optical power measurement without enclosing a free space optics optical tap and optical power monitor assembly within a housing.

Some implementations described herein enable optical power monitoring in free space optics with reduced noise and without enclosing the free space optics in a housing. For example, an optical element may be provided that is configured to block unwanted light that is directed toward an optical power monitor. In this case, the optical element may be a reflector with an absorptive housing. The reflector may direct a tapped portion of an optical beam toward an optical power monitor and the absorptive housing may absorb unwanted light (rather than the unwanted light being incident on the optical power monitor). In this way, the optical power monitor may perform a measurement of the tapped portion of the optical beam with reduced noise (e.g., from a reduced amount of incident unwanted light) relative to other optical assembly configurations.

Figure 1:
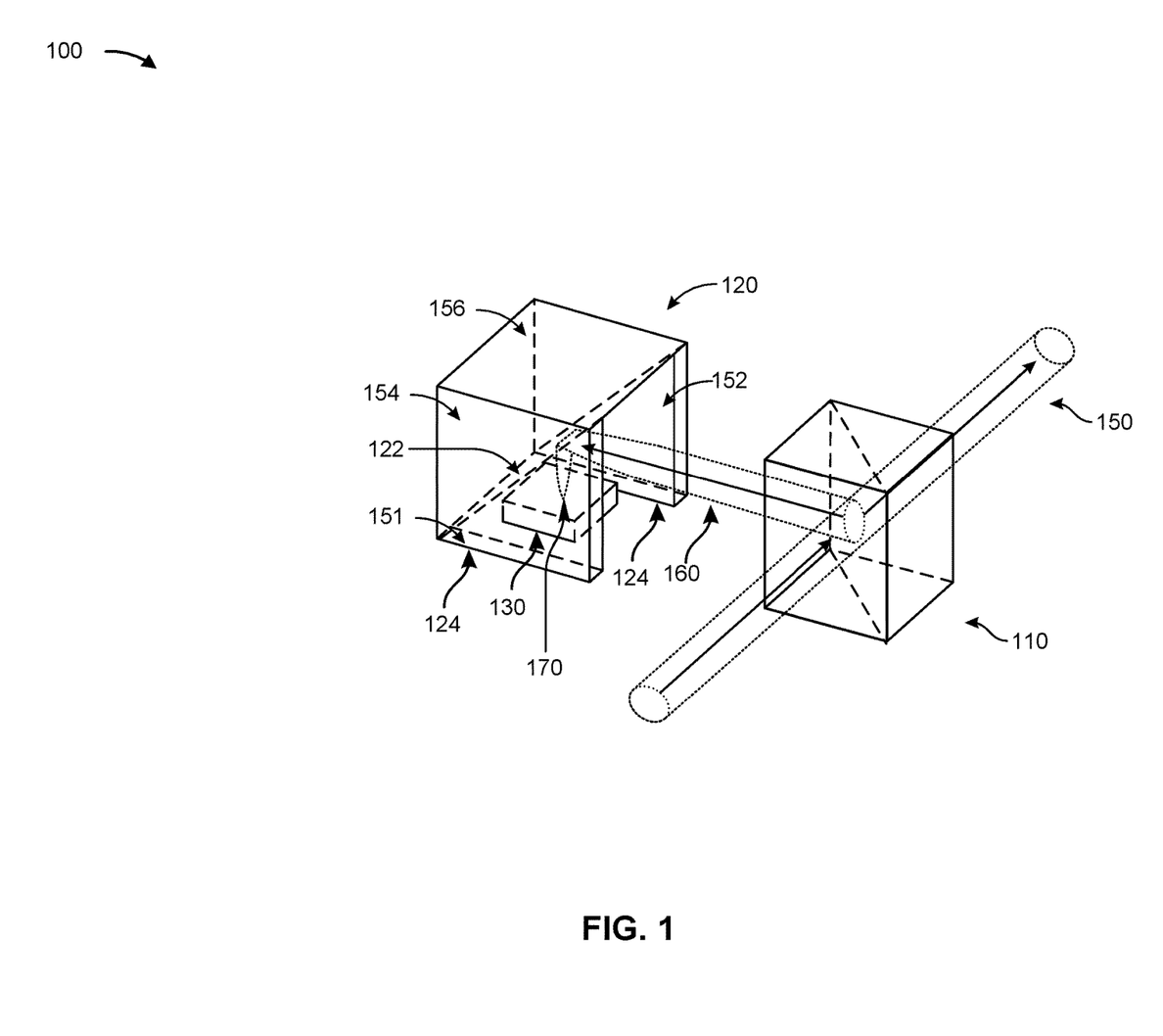
FIG. 1 is a diagram of an example implementation of a low noise optical assembly.

FIG. 1 is a diagram of an example implementation 100 of a low noise optical assembly. As shown in FIG. 1, example implementation 100 includes an optical tap 110, an optical element 120, and an optical power monitor 130. As shown in FIG. 1, optical tap 110, optical element 120, and optical power monitor 130 are implemented as free space optics.

Optical tap 110 may include a component configured to tap a portion of an optical beam. For example, an optical path 150 may direct an optical beam from an optical source to the optical tap 110, which may tap off a portion of the optical beam, and from the optical tap 110 to an optical destination. In some implementations, the optical tap 110 may be a beam splitter that splits an incident beam into two portions. For example, the optical tap 110 may be a cube beamsplitter that includes two triangular glass prisms. Additionally, or alternatively, the optical tap 110 may be waveguide tap that taps a portion of a beam, conveyed via the waveguide, off to a different waveguide or optical path.

The optical tap 110 may be an optical device that splits a beam into a first portion and a second portion. The first portion may remain along optical path 150, and the second portion may be directed toward the optical element 120 and the optical power monitor 130 via optical paths 160 and 170, respectively. A relative amount of light that is directed into each optical path (e.g., a first percentage of light that is in the first portion and a second percentage of light that is in the second portion) may be controlled by a composition of the optical tap 110. For example, the optical tap 110 may be configured for a 50:50 split of an incident optical beam (e.g., 50% of the optical beam is directed to optical path 150 and 50% of the optical beam is directed to optical path 160 and 170). Other splits are possible, such as a 90:10 split (e.g., 90% of the optical beam is directed to optical path 150 and 10% of the optical beam is directed to optical path 160 and 170), a 95:5 split, a 99:1 split, or any other splitting ratio.

In some implementations, an optical assembly or optical system may omit an optical tap 110. For example, an optical power monitor 130 may be configured to absorb only a first portion of an optical beam and pass through or reflect a second portion of the optical beam. In this case, the optical power monitor 130 may function as the optical tap of such an optical assembly or optical system. Similarly, the optical element 120 may be configured to direct the first portion of the optical beam and to pass through or reflect in a direction the second portion of the optical beam. In this case, the optical element 120 may function as the optical tap of such an optical assembly or optical system.

The optical element 120 may be an optical element configured to block unwanted light from being incident on the optical power monitor 130. For example, the optical element 120 may be an absorptive optical component with a reflector 122 (e.g., a mirror). In this case, the reflector 122 reflects a tapped portion of an optical beam from optical path 160 and from the optical tap 110 and directs the tapped portion of the optical beam along optical path 170 and to the optical power monitor 130. In some implementations, the optical element 120 may omit having a reflector 122, as is shown in FIG. 1. For example, the optical element 120 may be configured to allow a tapped portion of the optical beam from the optical tap 110 to propagate towards the optical power monitor 130 (e.g., without reflection).

In some implementations, the optical element 120 may include a particular material as an absorptive material or reflector material. Further, the optical element 120 may include a metal layer reflector or a dielectric mirror stack reflector for reflector 122. Additionally, or alternatively, the absorptive material of the optical element 120 may be formed from a filter glass material. For example, a filter glass that filters light in a wavelength range of the optical power monitor 130 may be used to ensure that light in the wavelength range of the optical power monitor 130 is blocked from being incident on the optical power monitor 130.

In some implementations, the optical element 120 may have one or more structures to block unwanted light from being incident on optical power monitor 130 (e.g., without impeding optical path 160 and the tapped portion of an optical beam). For example, the optical element 120 may have a set of wings 124 or other surfaces (e.g., that extend in a different direction than, such as an orthogonal direction among other examples, the reflector 122 and a back of the optical element 120) that provide an opening for optical path 160 to be incident on the reflector of the optical element 120 and optical path 170 to be incident on the optical power monitor 130, but that are absorptive to block unwanted light being incident on optical power monitor 130, as described in more detail herein.

In one example, as shown, the optical element 120 may form a cube shape and have a first absorptive side 151 (e.g., corresponding to a wing 124) and a second absorptive side 152 (e.g., corresponding to a wing 124) that surround the optical power monitor 130, a third absorptive side 154 and fourth absorptive side 156 that are associated with a reflector surface disposed on an absorptive structure. Further, the optical element 120 may have a fifth side (e.g., a front) that is open to allow the tapped portion of an optical beam to be directed to the reflector 122 and the optical power monitor 130. In this case, a sixth side (e.g., a bottom) may be formed by a substrate (not shown) that absorbs light to prevent the light from being incident on the optical power monitor 130. In another example that lacks a reflector 122, the optical power monitor 130 may be disposed against the third absorptive side 154 (e.g., disposed at least partially within the optical element 120, such that absorptive material of the optical element 120 at least partially surrounds the optical power monitor 130 but allows a portion of an optical beam to propagate toward the optical power monitor 130) to be directly aligned (e.g., without reflection) with the optical path 160.

The optical power monitor 130 may be a component configured to perform a measurement of a portion of an optical beam directed toward the optical power monitor 130. For example, the optical power monitor 130 may be a photodiode. In some implementations, the optical power monitor 130 may be configured to measure an optical power associated with a particular wavelength range. For example, the optical power monitor 130 may be configured to monitor and measure a portion of an optical beam in a range of 800 nanometers (nm) to 1700 nm or a sub-range thereof. In this case, the absorptive material of the optical element 120 may be configured to be absorptive in the range that the optical power monitor 130 is configured to monitor and measure, thereby avoiding unwanted light affecting a measurement by the optical power monitor 130. Similarly, the reflector of the optical element 120 may be configured to be reflective in a wavelength range that the optical power monitor 130 is configured to monitor and measure. In some implementations, the reflector may be transmissive or absorptive in another wavelength range, thereby ensuring that light incident on the optical power monitor 130 is in a selected wavelength range for a particular measurement rather than, for example, any wavelength range for which the optical power monitor 130 is configured.

Although optical tap 110, optical element 120, and optical power monitor 130 are depicted as being implemented in free space optics, it is contemplated that one or more components of an implementation described herein may be implemented in non-free space optics, such as a first portion of the optical path 160 between optical tap 110 and optical element 120 being implemented in a waveguide and a second portion of the optical path 160 being implemented in free space optics. Alternatively, additional components may be present in one or more implementations described herein that may or may not be implemented in free space optics. For example, two or more components (e.g., optical tap 110, optical element 120, optical power monitor 130, or other components) may be implemented as free space optics and/or two or more components (e.g., optical tap 110, optical element 120, optical power monitor 130, or other components) may be implemented as non-free space optics (e.g., integrated into a solid, housed, or monolithic assembly of one or more parts).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. For example, an optical system may include an optical emitter (e.g., an edge emitting laser, a vertical cavity surface emitting laser (VCSEL), or a light emitting diode (LED), among other examples), a controller (e.g., that controls the optical emitter based on a measurement performed by the optical power monitor 130), or an optical receiver (e.g., that uses the measurement performed by the optical power monitor 130 to enable reception, decoding, or noise removal, among other examples). Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2A:
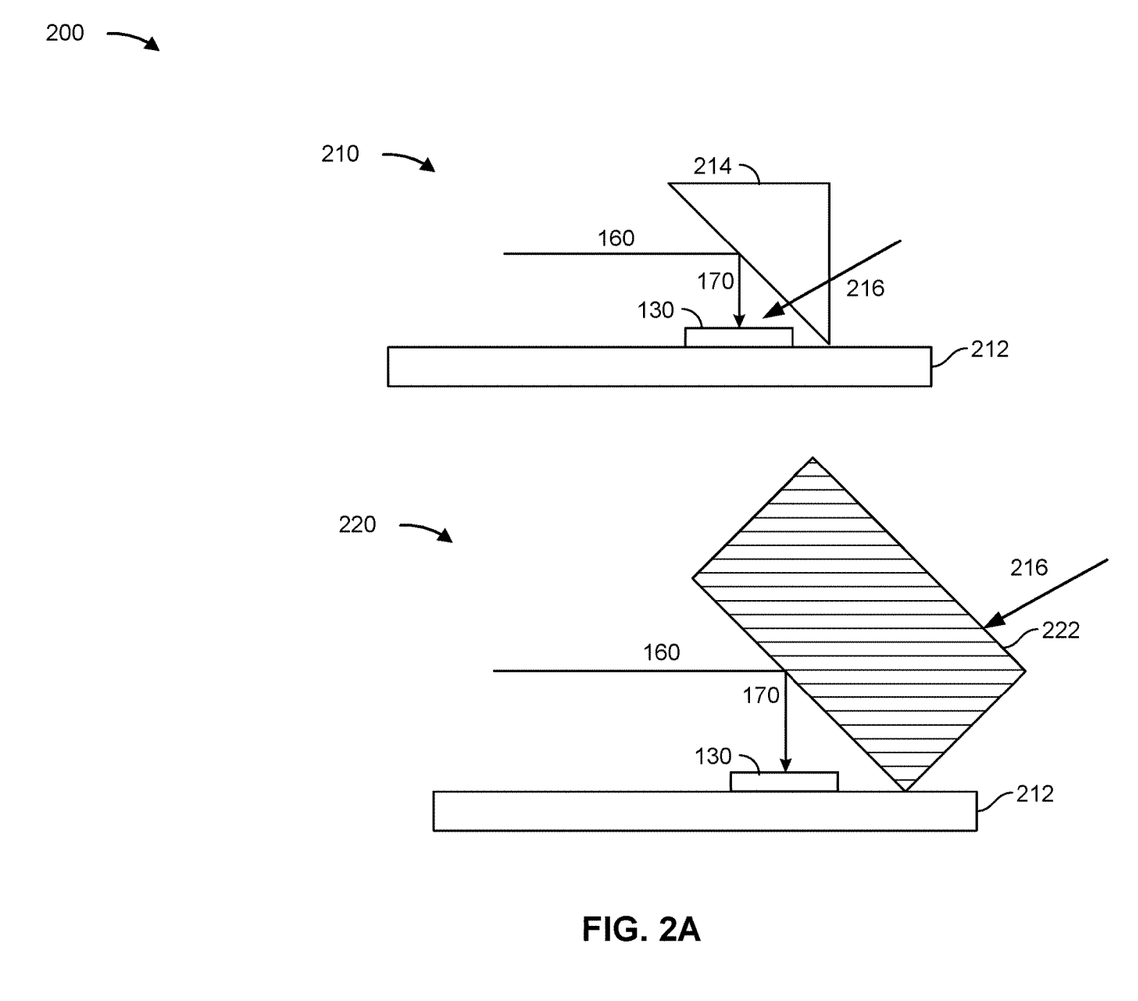
FIGS. 2A to 2B are diagrams of an example implementation of a low noise optical assembly.

FIGS. 2A to 2B are diagrams of example implementations 200 of a low noise optical assembly. As shown in FIG. 2A, and by side-view diagram 210, in a first configuration (e.g., a non-low noise optical assembly), an optical power monitor 130 is disposed on a substrate 212. An optical element 214, which does not include side-blocking (e.g., structures that at least partially surround the optical power monitor 130 to block unwanted light) or back-blocking (e.g., an absorptive material to block optical path 216, as shown), is disposed in optical path 160 to reflect light toward optical path 170 and optical power monitor 130.

In contrast, as shown by cross-sectional view diagram 220, in a second configuration, an optical power monitor 130 is disposed on substrate 212 and aligned to an optical element 222, which may correspond to optical element 120. In this case, optical element 222 includes back-blocking. For example, the optical element 222 may have an absorptive material (e.g., to absorb unwanted light) and a reflector is disposed to reflect a portion of an optical beam from optical path 160 to optical path 170 and toward the optical power monitor 130. As shown, based on having the absorptive material, optical path 216 is blocked, thereby preventing unwanted light from passing through optical element 222 and being incident on optical power monitor 130.

Figure 2B:
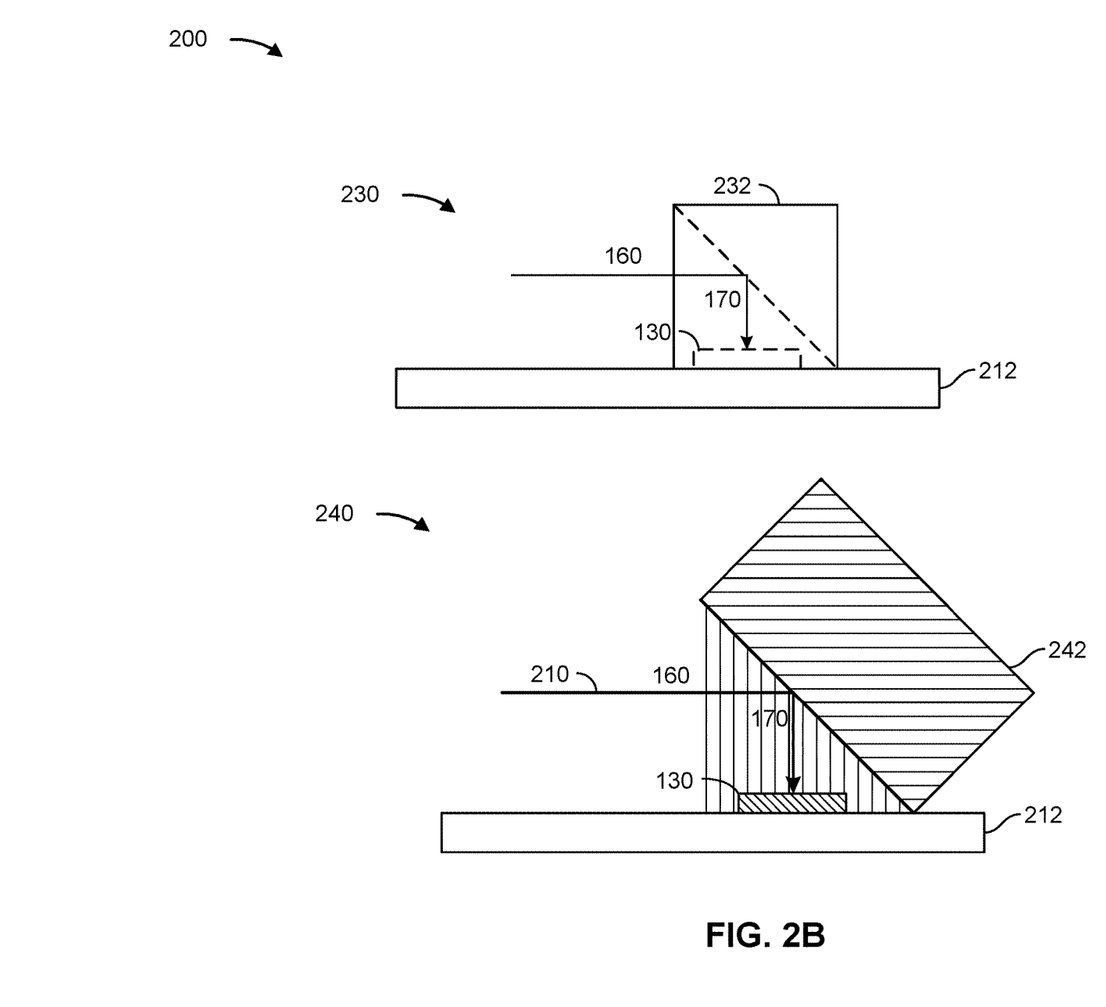

As shown in FIG. 2B and by side-view diagram 230, in a third configuration, another optical element 232 may have back-blocking to reduce unwanted light incident on optical power monitor 130. In this case, optical element 232 may be at least partially absorptive to achieve the back-blocking. As shown by cross-sectional diagram 240, in a fourth configuration, another optical element 242 may also have side-blocking and back-blocking to reduce unwanted light incident on optical power monitor 130. With respect to the third configuration and the fourth configuration, as shown, different shaped optical elements may be possible, such as an open cube shaped optical element (e.g., optical element 232) or an open non-cube shaped optical element (e.g., optical element 242).

As indicated above, FIGS. 2A to 2B are provided as examples. Other examples may differ from what is described with regard to FIGS. 2A to 2B.

Figure 3A:
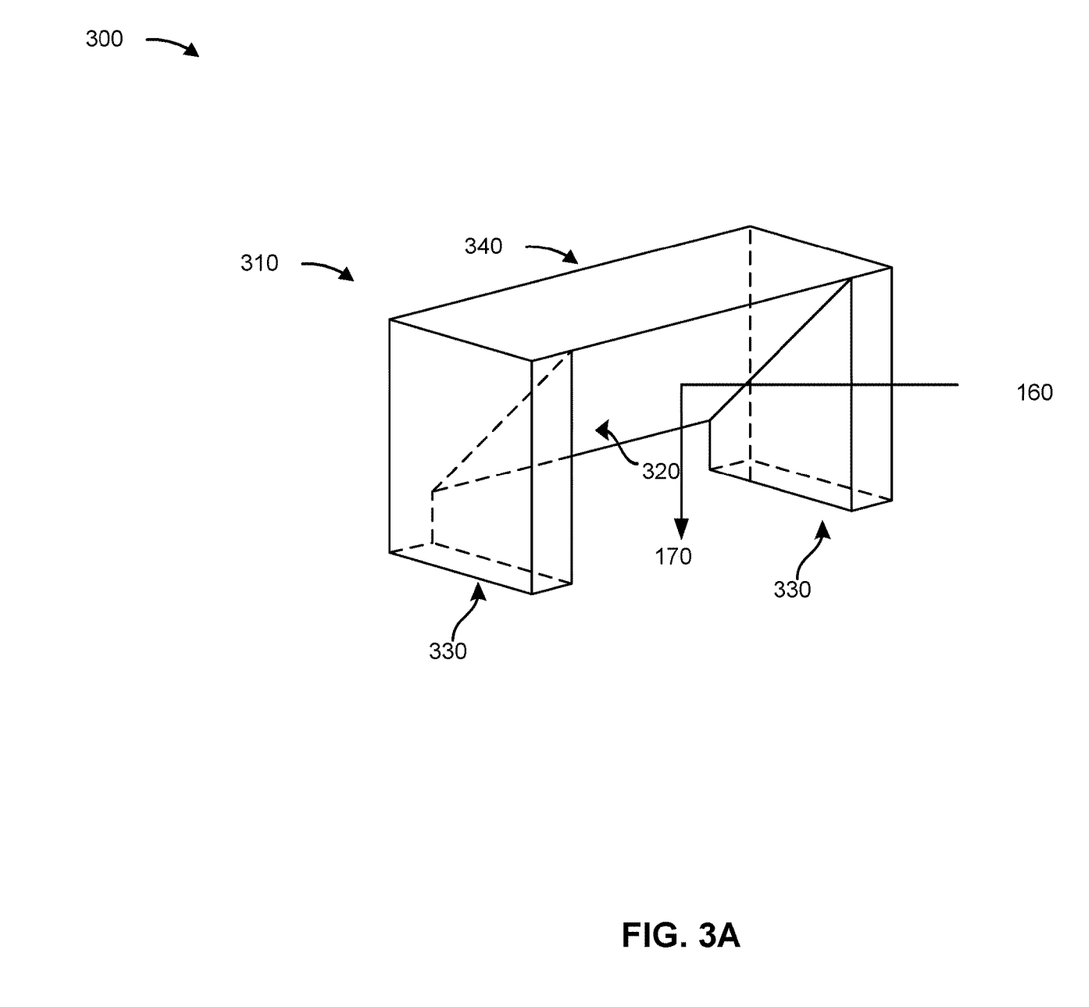
FIGS. 3A to 3B are diagrams of an example implementation of a low noise optical assembly.

FIGS. 3A to 3B are diagrams of an example implementation 300 of a low noise optical assembly. As shown in FIG. 3A, an optical element 310, which may correspond to optical element 120, may have a reflector surface 320, a set of side-blocking structures 330, and a back-blocking structure 340. The side-blocking structures 330 and the back-blocking structure 340 may partially surround or enclose an optical power monitor (not shown) to block unwanted light from being incident on the optical power monitor. The side-blocking structures 330 and the back-blocking structure 340 may leave an area for a tapped portion of an optical beam to be conveyed along optical path 160 from an optical tap (not shown) and along optical path 170 toward an optical power monitor.

In some implementations, reflector surface 320 may form a multiple of reflector faces or reflector portions. For example, reflector surface 320 may have a single continuous face that is divided into a first portion to reflect a first beam (e.g., to a first optical power monitor) and a second portion to reflect a second beam (e.g., to a second optical power monitor). In this case, the first portion and the second portion of reflector surface 320 may be arranged in a side-by-side arrangement, a top-and-bottom arrangement, or in another arrangement. Additionally, or alternatively, reflector surface 320 may be divided into multiple discrete faces. For example, a first face of reflector surface 320 may have a first characteristic, such as reflecting an optical beam in a first direction or with a first wavelength, and the second face of reflector surface 320 may have a second characteristic, such as reflecting an optical beam in a second direction or with a second wavelength.

In some implementations, reflector surface 320 may have a particular shape. For example, reflector surface 320 may have a flat face, a curved face, or a multi-faceted face. Additionally, or alternatively, reflector surface 320 may perform an optical function, such as by focusing light. For example, reflector surface 320 may form a lens or a set of lenses to focus an optical beam onto an optical power monitor. Additionally, or alternatively, reflector surface 320 may form a grating or filter to filter or otherwise modify an optical beam incident thereon. In some implementations, other optical elements may be formed on reflector surface 320 or in an optical path, described herein, such as a filter, a lens, or a grating, among other examples.

Figure 3B:
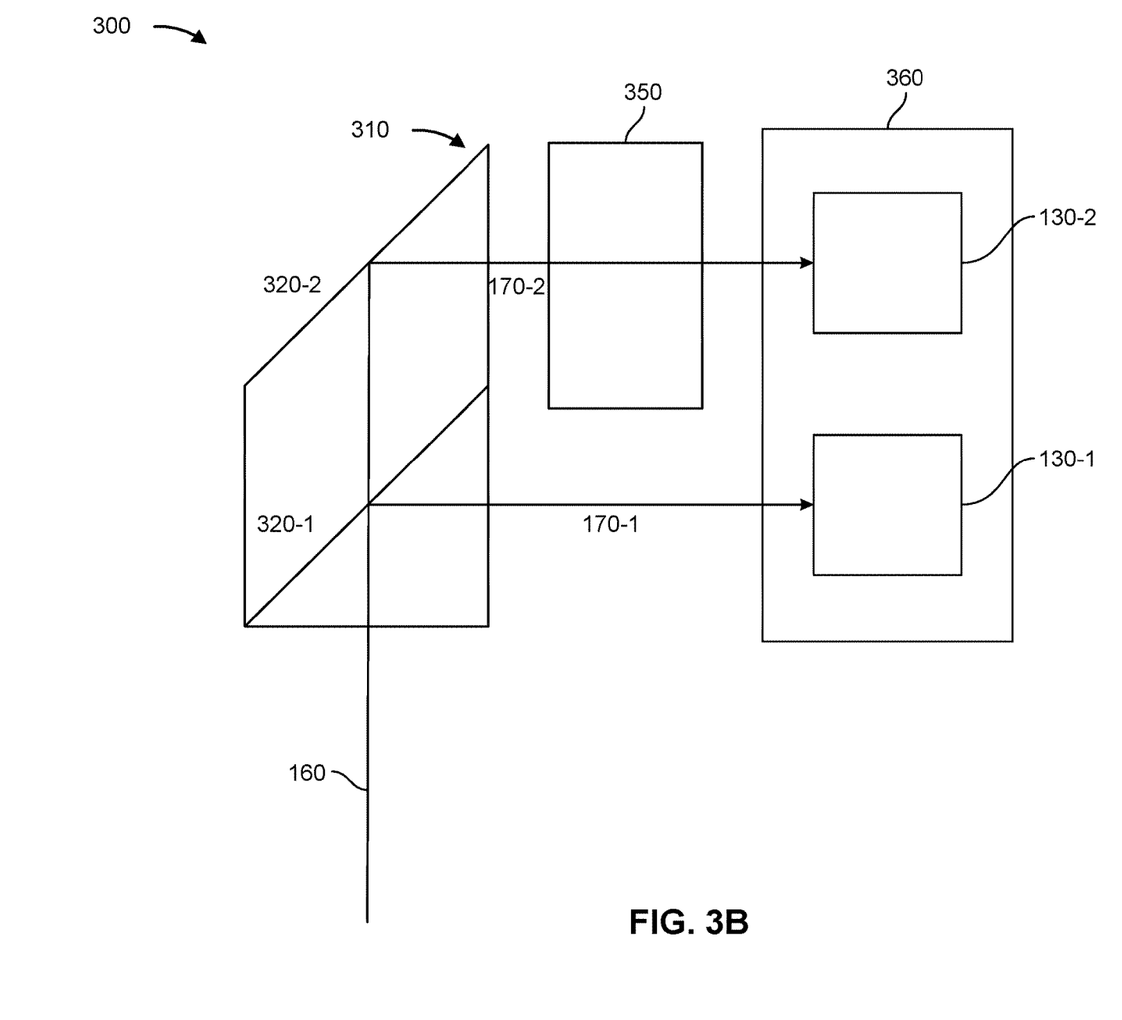

FIG. 3B shows a plan view of an optical element 310 with multiple faces for reflecting light along multiple optical paths. Although parts, such as optical element 310, substrate 360, and optical power monitors 130 are shown as separated in the plan view, it is contemplated that the parts may be provided in an assembly (e.g., with optical element 310 attached to substrate 360 and at least partially surrounding optical power monitors 130 and/or etalon 350).

As shown, the optical element 310 includes a first reflector 320-1 that reflects a first portion of a tapped optical beam from optical path 160 toward a first optical power monitor 130-1 via a first optical path 170-1. Additionally, or alternatively, the optical element 310 includes a second reflector 320-2 that reflects a second portion of the tapped optical beam from optical path 160 toward a second optical power monitor 130-2 via a second optical path 170-2. Although some implementations are described in terms of one or two optical power monitors and one or more optical paths (e.g., reflecting off one or two portions of an optical element), it is contemplated that different quantities of optical power monitors, optical paths, and optical element portions or faces are possible, such as three or more optical power monitors. Other optical splitting configurations are contemplated, such as beam 170-1 being split to form beam 170-2 rather than beam 170-2 being formed from a second split from beam 160.

As shown, the first optical power monitor 130-1 and the second optical power monitor 130-2 may be disposed on a common substrate 360, in some implementations. Additionally, or alternatively, an etalon 350 may be disposed in one of the optical paths 170, as shown. Etalon 350 may be a Fabry-Perot etalon. Although a Fabry-Perot etalon is described, it is contemplated that example implementation 300 may be used in or with a filter, a Mach-Zehnder interferometer, or a Michelson interferometer, among other examples.

The etalon 350 may be disposed in optical path 170-2. In this case, a controller (not shown) may compare a first measurement of optical power monitor 130-1 (e.g., without an etalon positioned in optical path 170-1) and a second measurement of optical power monitor 130-2 (e.g., with the etalon 350 in optical path 170-2) for performing wavelength locking. As shown, in some implementations, reflector surfaces may be disposed in a front-and-back arrangement. For example, the first portion of the tapped optical beam is reflected by first reflector 320-1 and the second portion of the tapped optical beam is passed through first reflector 320-1 to second reflector 320-2, as shown. In another example, rather than a front-and-back arrangement, multiple reflector surfaces may be disposed in a side-by-side arrangement. In this case, reflector 320-1 and reflector 320-2 may be disposed on the same face of an optical element 310 and may, for example, receive the first portion of the tapped optical beam via a first optical path 160 and the second portion of the tapped optical beam via a second optical path 160, respectively. It is contemplated that other shapes of optical elements may be possible to reduce an amount of unwanted light incident on one or more optical power monitors and other quantities of reflectors may be possible on a single optical element (or on multiple optical elements included in a common assembly or system).

As indicated above, FIGS. 3A to 3B are provided as examples. Other examples may differ from what is described with regard to FIGS. 3A to 3B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:
1. An optical assembly, comprising:
an optical power monitor to receive a portion of an optical beam and to perform a measurement on the portion of the optical beam;
an optical tap to tap the optical beam and to provide the portion of the optical beam; and an optical element to allow the portion of the optical beam from the optical tap to propagate toward the optical power monitor,
wherein the optical element includes an absorptive material to absorb light other than the portion of the optical beam that is propagated toward the optical power monitor, and
wherein the optical element is configured to direct the portion of the optical beam toward the optical power monitor without the portion of the optical beam propagating through the optical element.

2. The optical assembly of claim 1, wherein the optical element includes a reflector material to reflect the portion of the optical beam toward the optical power monitor.

3. The optical assembly of claim 1, wherein the optical power monitor is disposed at least partially within the optical element and in a path of the portion of the optical beam without reflection.

4. The optical assembly of claim 1, wherein an optical path of the portion of the optical beam, between the optical element and the optical power monitor, consists of free space.

5. The optical assembly of claim 1, wherein two or more of the optical tap, the optical element, and the optical power monitor are integrated into a solid assembly of one or more parts.

6. The optical assembly of claim 1, wherein the optical tap is a beam splitter or waveguide tap.

7. The optical assembly of claim 1, wherein the absorptive material absorbs light in at least a wavelength range that the optical power monitor is configured to monitor.

8. The optical assembly of claim 7, wherein the wavelength range that the optical power monitor is configured to monitor is in a range of 800 nanometers (nm) to 1700 nm.

9. An optical assembly, comprising:
at least one optical power monitor to receive a portion of an optical beam and to perform a measurement on the portion of the optical beam;
an optical tap to tap the optical beam and provide the portion of the optical beam; and
an optical element to direct the portion of the optical beam from the optical tap toward the at least one optical power monitor,
wherein the optical tap, the optical element, and the at least one optical power monitor are separated by free space,
wherein the optical element is configured to direct the portion of the optical beam toward the at least one optical power monitor without the portion of the optical beam propagating through the optical element, and
wherein the optical element includes an absorptive material to absorb light other than the portion of the optical beam and a reflector material to reflect the portion of the optical beam toward the at least one optical power monitor.

10. The optical assembly of claim 9, wherein the absorptive material includes a first section to absorb first light other than the portion of the optical beam and a second section to absorb second light other than the portion of the optical beam,
wherein the first section extends in a first direction relative to the reflector material and the second section extends in a second direction relative to the reflector material that is different from the first direction.

11. The optical assembly of claim 9, wherein the absorptive material at least partially surrounds the optical power monitor without blocking the portion of the optical beam.

12. The optical assembly of claim 9, wherein the at least one optical power monitor comprises a first optical power monitor and a second optical power monitor, and
wherein the reflector material includes a first reflector face portion aligned to the first optical power monitor and a second reflector face portion aligned to the second optical power monitor.

13. The optical assembly of claim 12, wherein the first reflector face portion and the second reflector face portion are disposed in a side-by-side arrangement or a front-and-back arrangement.

14. The optical assembly of claim 9, further comprising:
one or more etalons arranged in one or more optical paths of one or more optical power monitors of the at least one optical power monitor.

15. An optical system, comprising:
an optical emitter to emit an optical beam;
an optical power monitor to receive a portion of the optical beam; and
an optical element to direct the portion of the optical beam toward the optical power monitor,
wherein the optical element includes an absorptive material to absorb light other than the portion of the optical beam and a reflector to reflect the portion of the optical beam toward the optical power monitor, and
wherein the optical element is configured to direct the portion of the optical beam toward the optical power monitor without the portion of the optical beam propagating through the optical element.

16. The optical system of claim 15, wherein the reflector is associated with at least one of a flat face, a curved face, or a multi-faceted face.

17. The optical system of claim 15, wherein the reflector is a metal layer reflector or a dielectric mirror stack reflector.

18. The optical system of claim 15, wherein the absorptive material is a filter glass material.

19. The optical system of claim 15, wherein the reflector is configured to focus the portion of the optical beam onto the optical power monitor.

20. The optical system of claim 15, further comprising:
a controller configured to control the optical emitter based on a measurement of the portion of the optical beam by the optical power monitor.

* * * * *